United States Patent Office 3,449,634
Patented June 10, 1969

3,449,634
OVERVOLTAGE PROTECTION DEVICE FOR REGULATED POWER SUPPLIES
Han-Min Hung, Cambria Heights, N.Y., assignor to Forbro Design Corp., New York, N.Y., a corporation of New York
Filed Dec. 23, 1966, Ser. No. 604,380
Int. Cl. H02h 3/28
U.S. Cl. 317—31                                                      10 Claims

ABSTRACT OF THE DISCLOSURE

An overvoltage protection circuit for direct current (DC) power supplies compares a portion of the voltage across the load to be protected with a reference voltage using a Schmitt trigger which also generates a pulse to fire a crowbar silicon controlled rectifier also connected across the load whenever the load voltage exceeds a predetermined voltage for longer than a minimum time interval.

---

Figure 1:
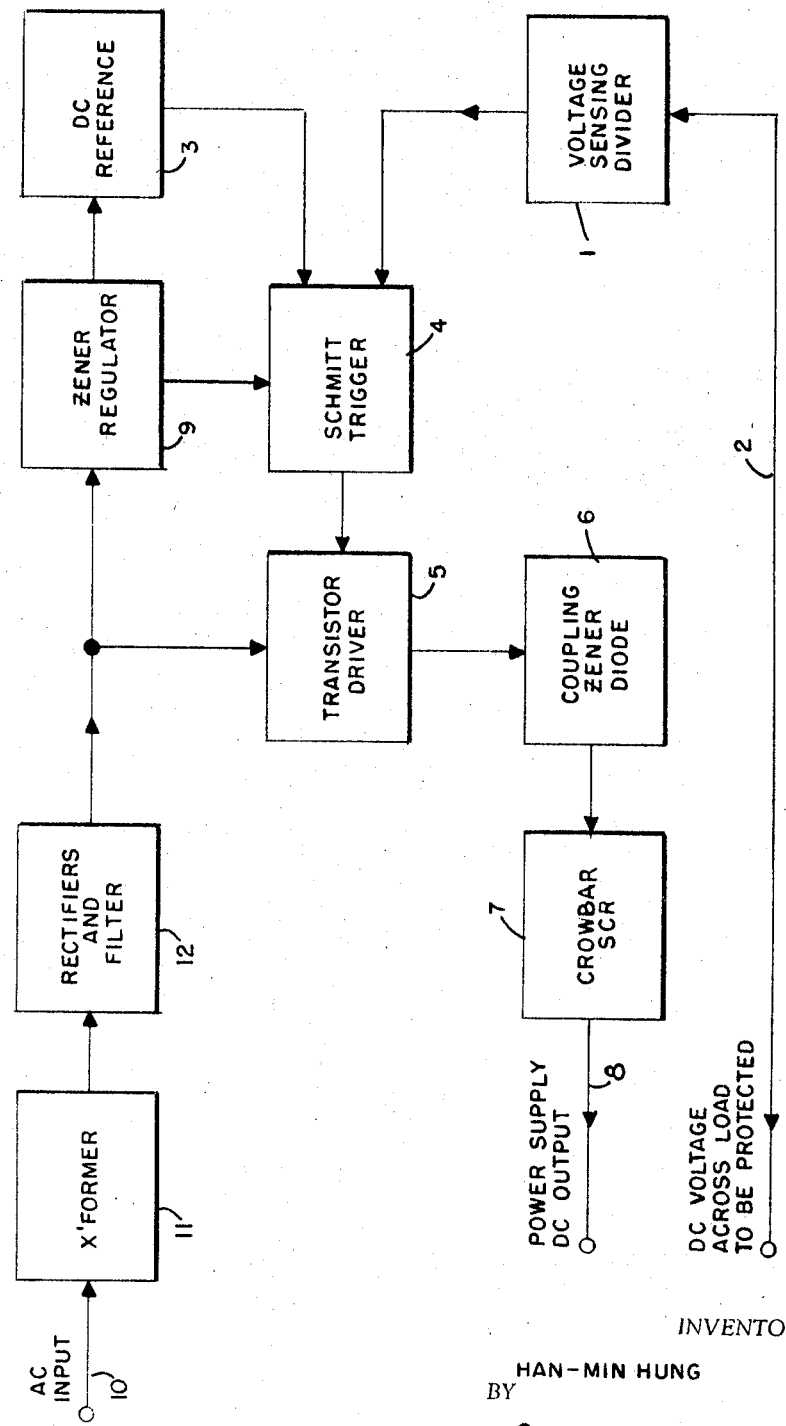

The present invention concerns an overvoltage protection circuit, and in particular, remote voltage sensing and automatic tracking overvoltage protection for voltage controllable DC power supplies.

The overvoltage protection circuit in the present invention is an improvement over the conventional crowbar type overvoltage protection circuit for several reasons. The conventional circuit must be placed directly across terminals of the load to be protected in order to obtain good protection, but in many applications there is not enough room adjacent to the load for such an overvoltage protection circuit. Quite often, such a circuit is located inside the DC power supply, which delivers power to the load to be protected. In the case where the load is operated at high current, the voltage drop along the leads connecting the load to the power supply will be a significant portion of the output voltage when the operating voltage is low. The protection threshold voltage of the conventional overvoltage protection circuit has to be set loosely to tolerate the lead drop. The circuit in the present invention will overcome the above-mentioned difficulty. In this circuit, there are signal leads for remote voltage sensing, which detects the voltage across load to be protected. Any voltage drop in the power leads up to 1 volt per lead is allowed without affecting the accuracy of overvoltage protection. There is no restriction for the location of the circuit at all. It can be put in the power supply, or adjacent to the load, or at any other convenient spot.

The present invention also provides a simple means of obtaining an automatic tracking type overvoltage protection for a variable DC power supply. As the output voltage of power supply varies, the level of overvoltage protection varies accordingly. This overvoltage level is always above the power supply output voltage by a certain percentage, which can be adjusted as one wishes. In case that the power supply output voltage exceeds the preset level for overvoltage caused by either failures in the power supply such as shorted pass elements or an accidental connection to another voltage source, the overvoltage protection circuit will be actuated to crowbar the supply output. And further since this circuit provides multi-turn potentiometers for adjusting overvoltage level, a precise setting can be achieved throughout a wide range of voltage. Since the auxiliary power of this circuit is derived from AC source, very small current is taken from the DC power supply.

Accordingly, one object of the present invention is to provide methods of and means for overvoltage protection of regulated DC power supplies which is more accurately settable than such protection has been hitherto.

Another object is to provide overvoltage protection particularly adapted to protect low voltage, high current loads.

Still another object is to provide overvoltage protection which automatically tracks the output of an adjustable output regulated DC power supply.

These and other objects will be apparent from the detailed description of the invention given below in connection with the various figures of the drawing.

Figure 2:
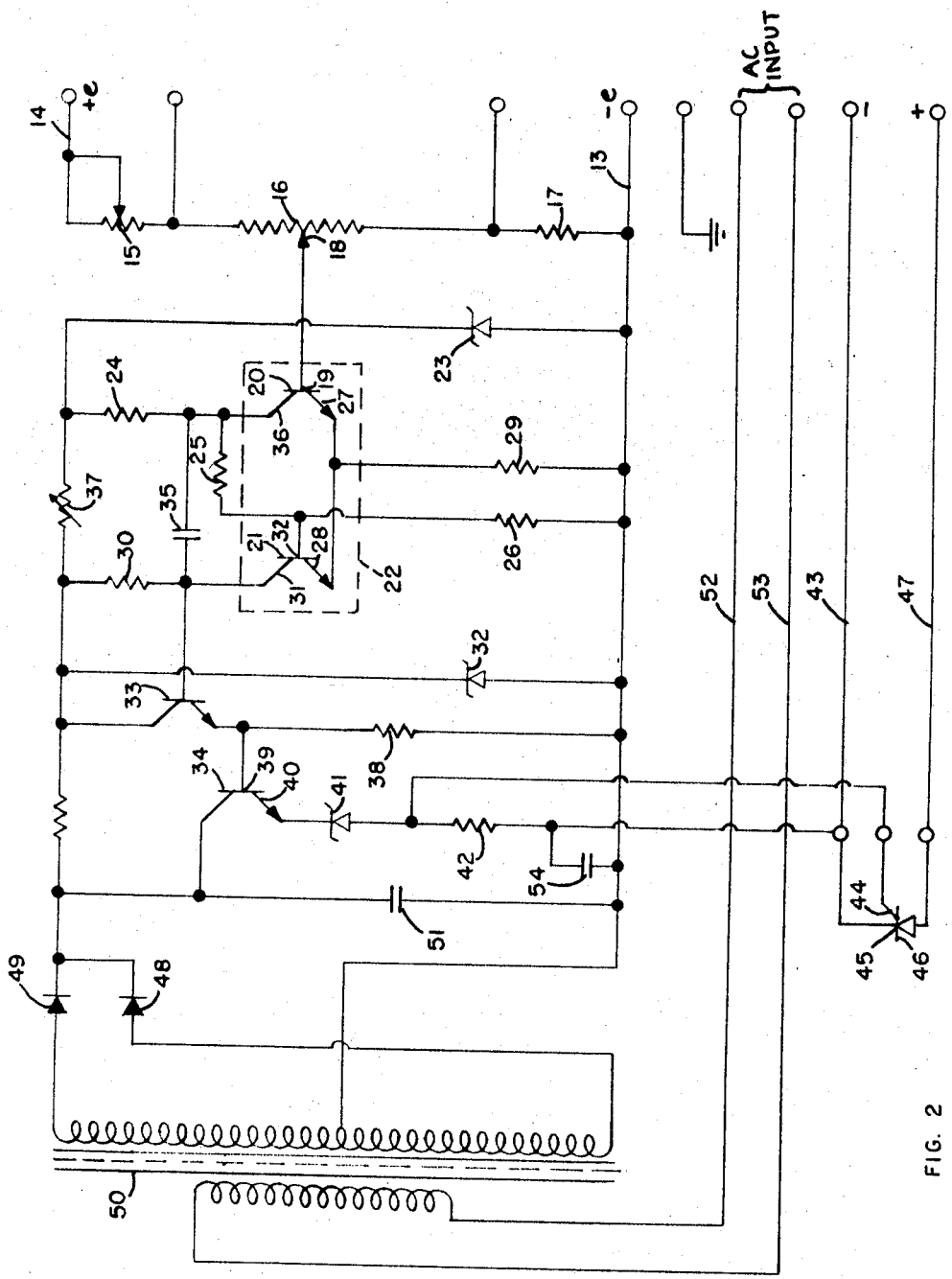
Figure 3:
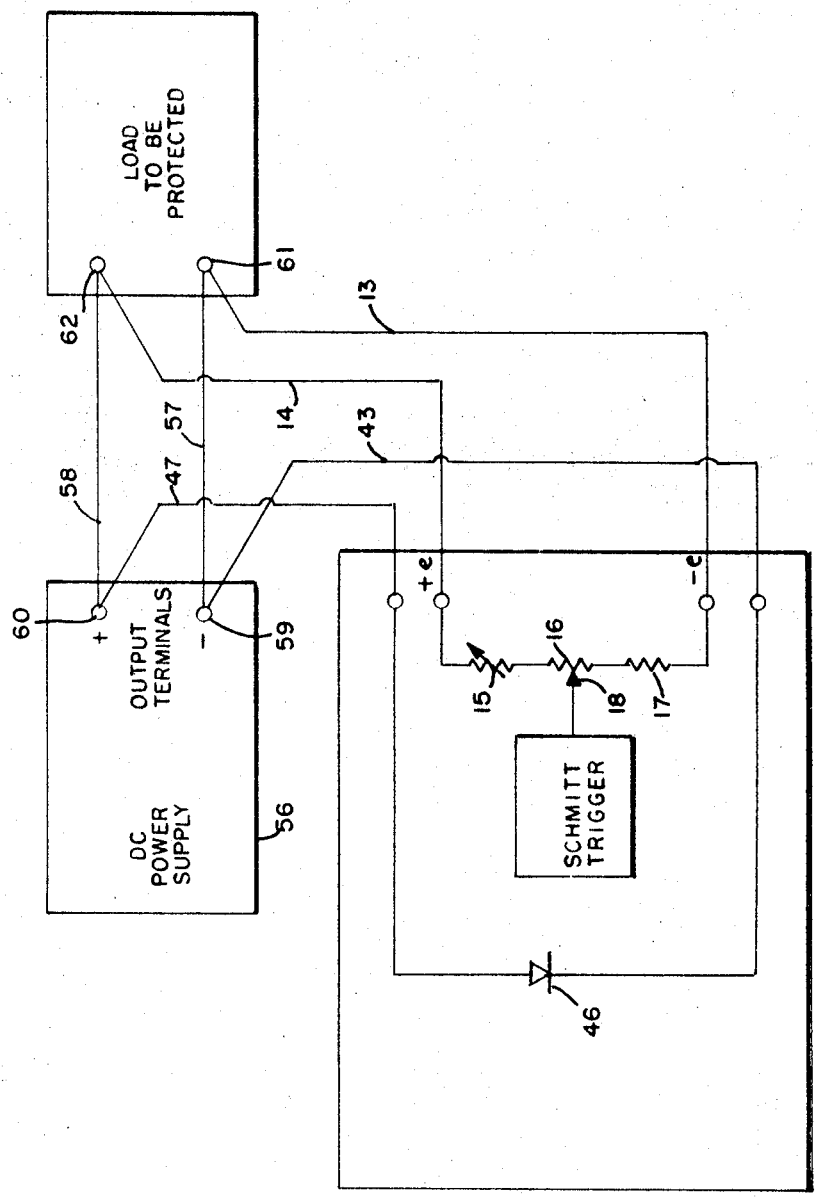
Figure 4:
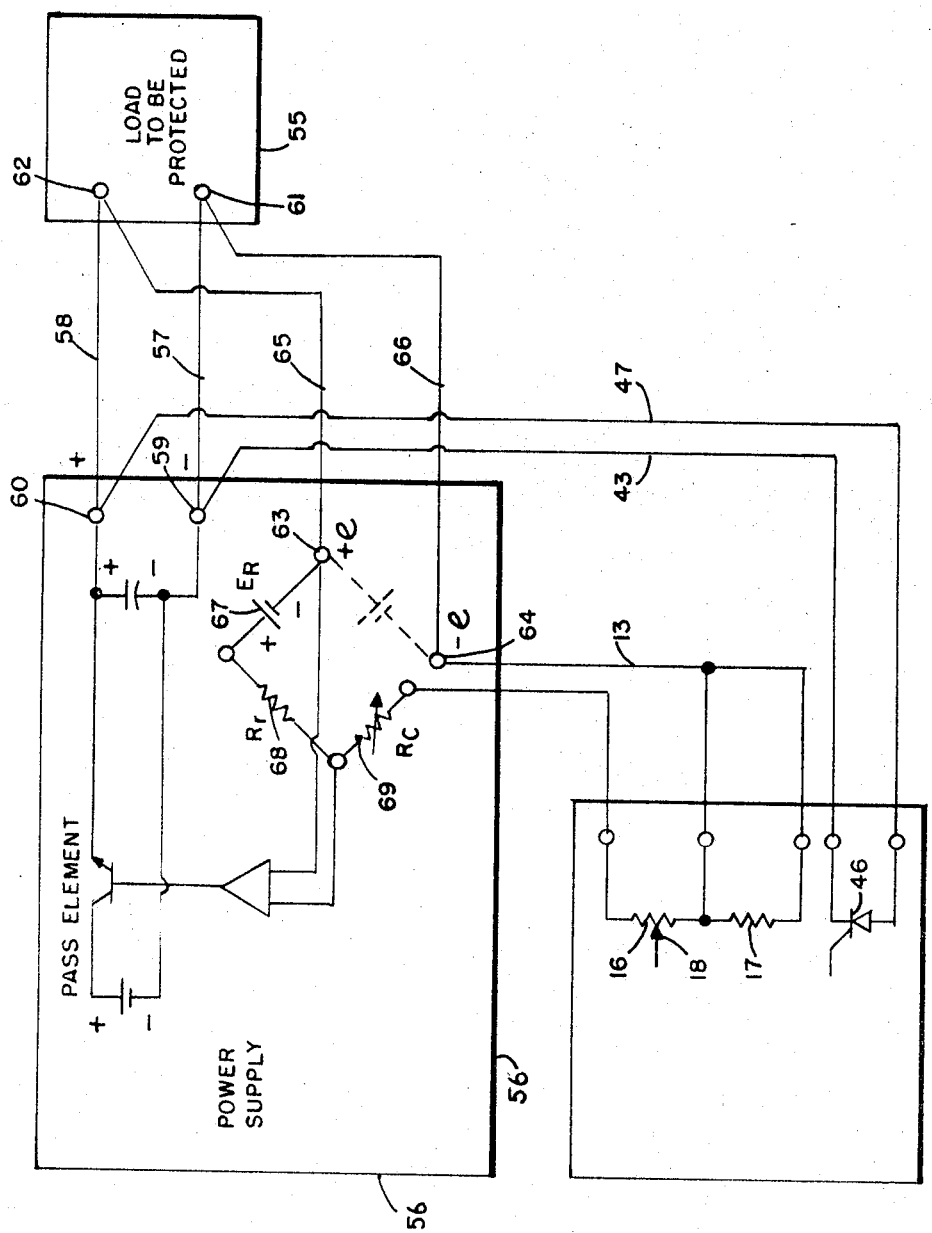
Figure 5:
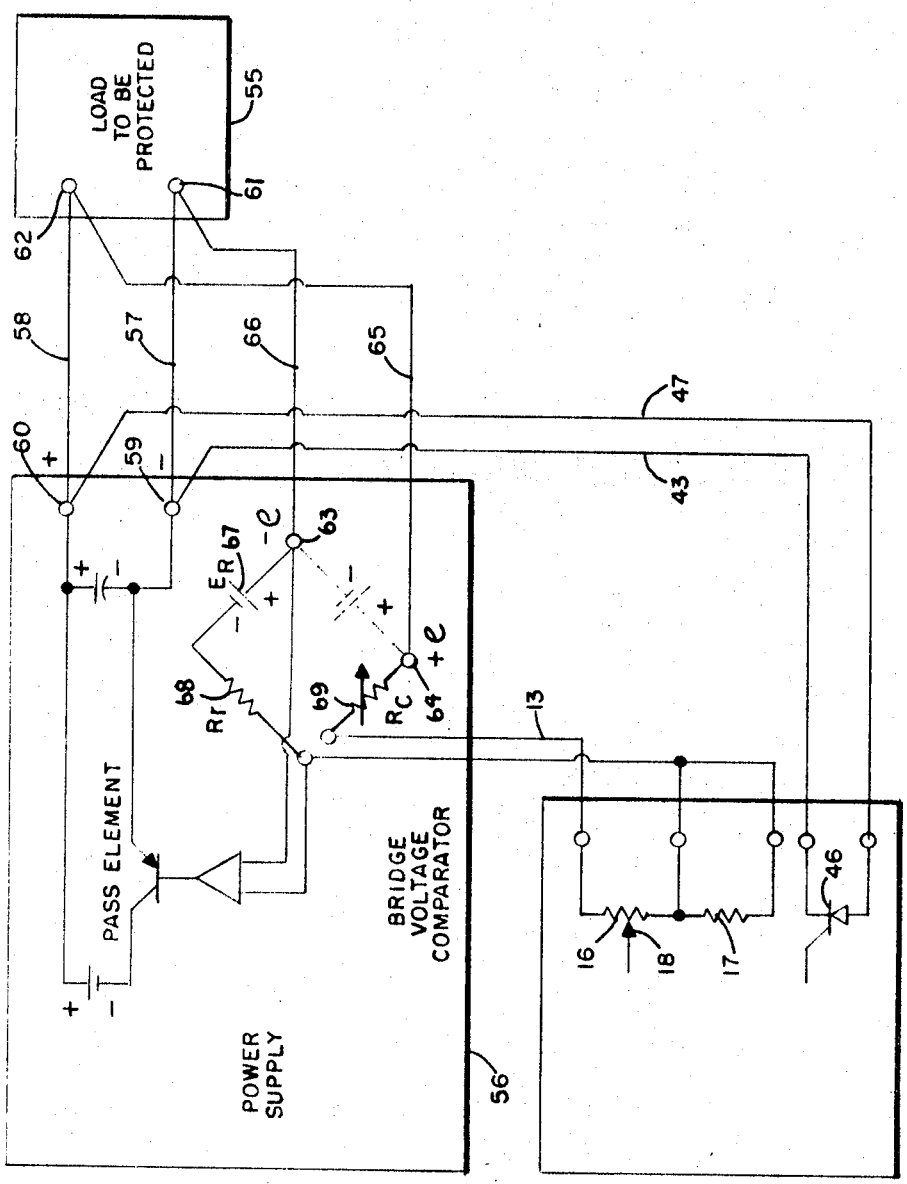
Figure 6:
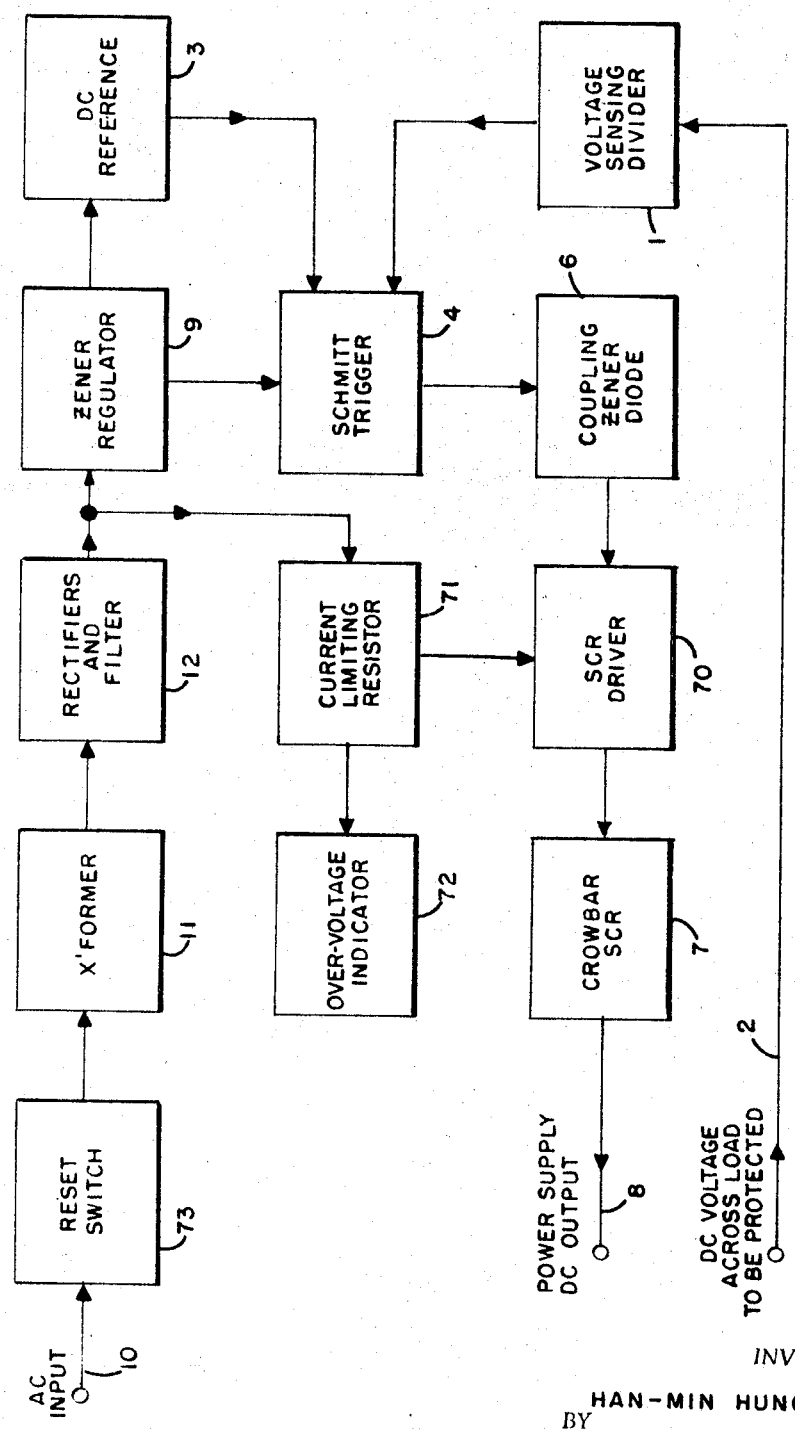
Figure 7:
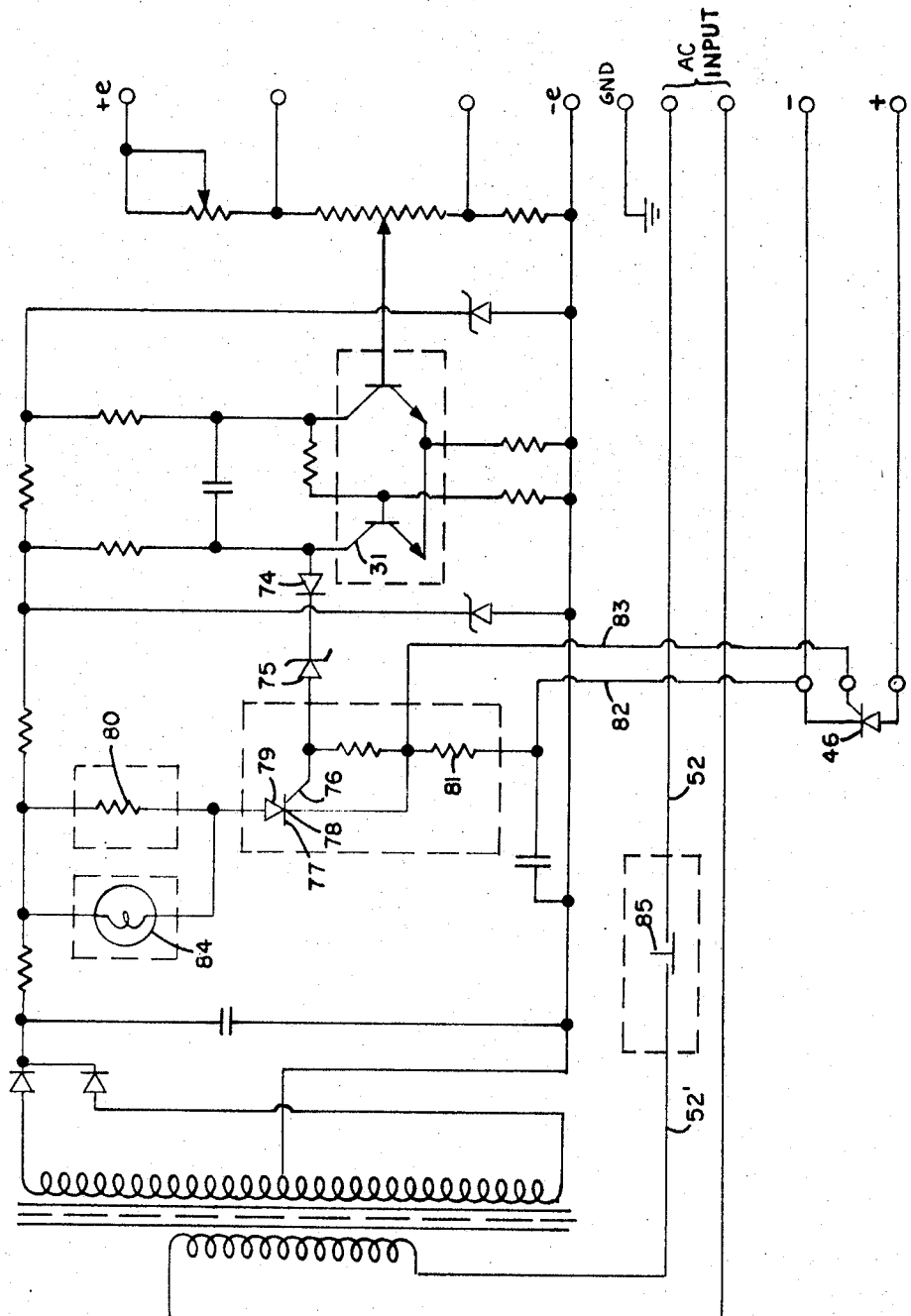
Figure 8:
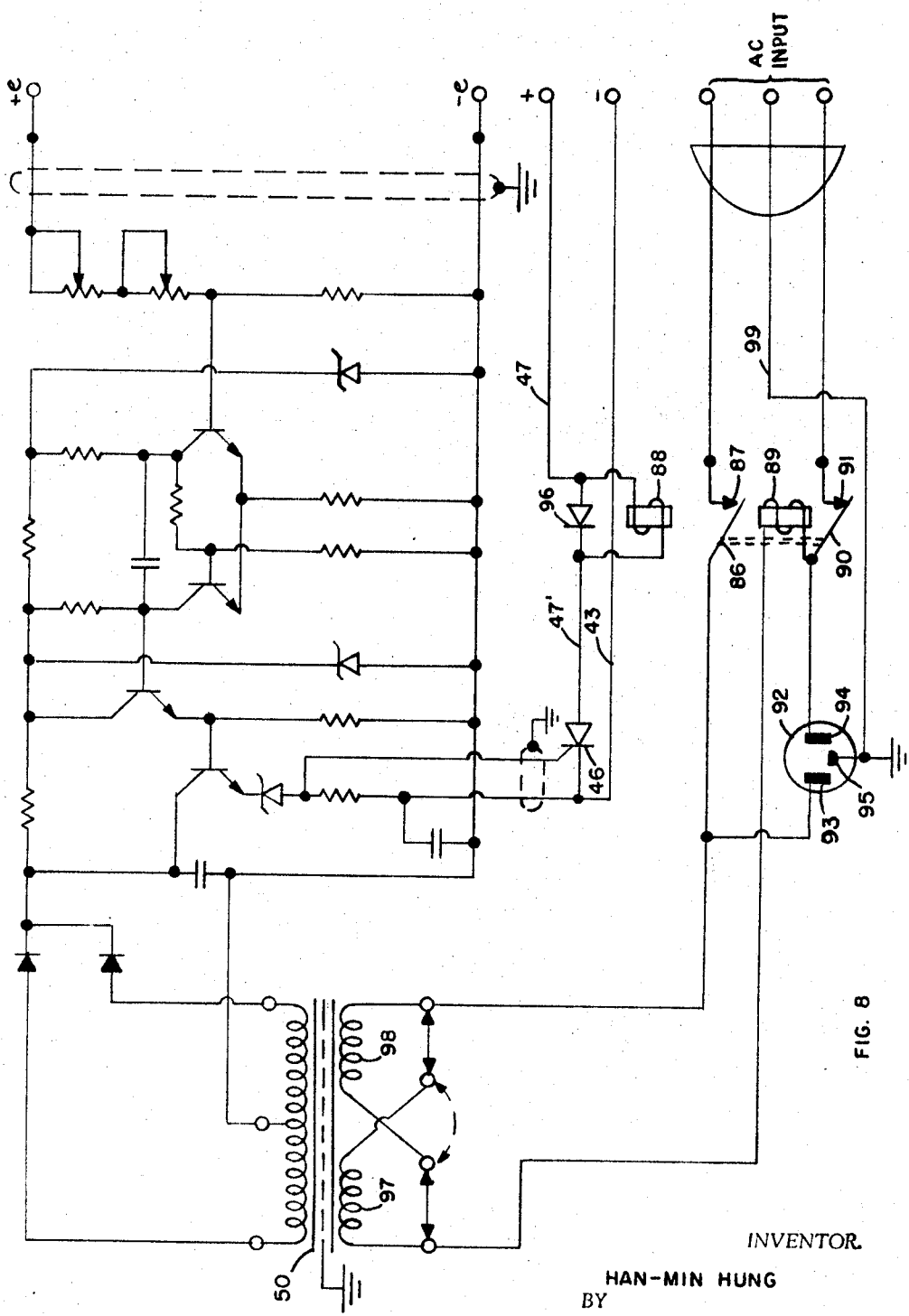

In the drawing:
FIGURE 1 is a block diagram of one form of the present invention.
FIGURE 2 is a schematic circuit diagram of the form of the invention shown in block form in FIGURE 1.
FIGURE 3 is a diagram showing the present invention connected in remote voltage sensing mode.
FIGURE 4 is a diagram showing the present invention connected for automatic tracking of a power supply utilizing a pass device in the positive line.
FIGURE 5 is similar to FIGURE 4 except for a power supply utilizing a pass device in the negative line.
FIGURE 6 is a block diagram of a modified form of the present invention.
FIGURE 7 is a schematic circuit diagram of the form of the invention shown in block form in FIGURE 6.
FIGURE 8 is a schematic circuit diagram of a still further modified form of the present invention.

The operation of one form of the present invention will be described in connection with the block diagram in FIGURE 1. The DC voltage across load to be protected is connected to the sensing divider 1 over lead 2. A portion of this voltage is compared against a DC reference 3 at the input to the Schmitt trigger 4. If the sensed voltage is high enough, the Schmitt trigger will be actuated. The output of this Schmitt trigger turns on the transistor driver stage 5, which through the coupling Zener diode 6 triggers the crowbar SCR 7, shorting the output DC power supply over lead 8. The Schmitt trigger is fed from a Zener regulator 9, which also feeds the DC reference 3. The raw DC voltage that feeds both the transistor driver and the Zener regulator is derived from the AC input 10 through the transformer 11, rectifiers and filter 12.

FIGURE 2 shows the schematic of the overvoltage protection circuit of the form of FIGURE 1. The voltage across the load to be protected is connected across a voltage divider, over leads 13 and 14, consisting of rheostat 15, potentiometer 16 and resistor 17. The positive end of this voltage is connected over lead 14 to rheostat 15. The divided voltage from the wiper 18 of potentiometer 16 feeds the base 19 of transistor 20, which together with transistor 21 forms a Schmitt trigger (4 of FIG. 1). A common heat sink 22 is provided for transistors 20 and 21 to achieve a high degree of temperature stability. The DC reference (3 of FIG. 1) is provided by Zener diode 23. A part of this reference is applied to the base of transistor 21 through a voltage divider formed by resistors 24, 25 and 26. Emitters 27 and 28 of transistors 20 and 21 respectively are tied to a common emitter resistor 29. Transistor 20 is normally off while the transistor 21 is normally on. The collector 31 of transistor 21 is connected to an 18 volt Zener regulator 32 through resistor 30. Collector 36 is also connected across Zener 32 through collector resistor 24 and decoupling resistor 37. When an overvoltage condition occurs, and the base voltage of transistor 20 exceeds the voltage on base 32 of transistor 21 by approximate 0.1 volt, which is the difference between the base to emitter voltage of transistor 21 when "on" and the base to emitter voltage of transistor 20 when "off," a switching takes place in the Schmitt trigger. Transistor 21 turns off and the transistor turns on. The collector voltage of transistor 21 increases to turn on the transistor driver consisting of transistors 33 and 34. The capacitor 35 connecting collectors 31 and 36 in the Schmitt trigger forms part of a lag network. The purpose of this capacitor 35 is to reduce the sensitivity of the overvoltage protection circuit such that the circuit does not respond to very narrow overvoltage pulses (say 40 microseconds) caused by transients. The transistor 33 and resistor 38 form an emitter follower, whose input is from collector 31 and whose output is connected to the base 39 of transistor 34. The emitter 40 of transistor 34 is connected to the positive end of Zener diode 41, the negative end of which is connected through resistor 42 to the negative terminal of DC power supply being protected over lead 43. As the collector voltage of transistor 21 exceeds the sum of the base to emitter voltages of transistors 33 and 34, the Zener voltage of the coupling Zener diode 41, the gate to cathode drop of silicon-controlled rectifier SCR 46, and the lead drop between the negative terminal of power supply over lead 43 and the negative terminal of load over lead 13, the Zener diode 41 breaks down to develop a voltage across resistor 42. This voltage with proper polarity is connected across the gate 44 and the cathode 45 of silicon-controlled rectifier SCR 46. This SCR 46 is connected directly across the power supply output terminals over leads 43 and 47. When the input signal is big enough to trigger as described above during overvoltage condition, SCR 46 will crowbar the power supply over leads 43 and 47 and the output voltage of power supply will be reduced to the SCR conduction drop of the order of 1 volt and thus the load is protected. Rectifiers 48 and 49, transformer 50 and filter capacitor 51 provide the raw DC power for transistor 34 and Zener diode 32. Transformer 50 is a step-down transformer to provide the desired voltage from the AC line (over leads 52 and 53). Rheostat 15 is provided to adjust the current through the sensing divider potentiometer 16 and as to adjust the range of overvoltage which can be selected. With adjustments of this rheostat and potentiometer, any overvoltage level throughout a wide range can be selected. Due to common emitter arrangement in the Schmitt trigger, good temperature stability is obtained. Further temperature compensation can be made by varying the resistance of resistor 37 to control the bias current through the reference Zener diode 23. Capacitor 54 reduces the noise pick-up when the remote voltage sensing is used as will be described in detail below.

A connection diagram for remote voltage sensing is shown in FIGURE 3. The crowbar SCR 46 is connected across the output terminals 59 and 60 of power supply 56 to be protected. The sensing divider 15, 16, and 17 is connected to load terminals 61 and 62 over leads 13 and 14. Voltage drop between 60 and 62 or the drop between 59 and 61 can be as high as one volt without affecting the accuracy of overvoltage level. The overvoltage protection circuit as described above monitors the voltage across load to be protected so that the voltage drop in the connecting leads does not affect the triggering point.

FIGURE 4 and FIGURE 5 indicate the proper interconnection to provide automatic tracking overvoltage protection for power supplies with bridge type voltage comparator. Reference is made to U.S. Patent No. 3,028,538 for a description of this bridge type circuit. FIGURE 4 is for a power supply whose pass-element is in the positive leg, and FIG. 5 is for a power supply whose pass-element is on the negative leg. Terminals 63 and 64 are remote error sensing terminals of the power supply, since they apply over leads 65 and 66 the voltage of the load to the appropriate bridge terminals. $E_R$ (67) is the reference voltage, $R_r$ (68) is the reference resistor. The potentiometer 16 and resistor 17 in the overvoltage protection circuit and the original control resistor $R_c$ (69) form the control arm of bridge comparator. During an overvoltage condition, the bridge current is increased, increasing the potential at the wiper 18 of potentiometer 16. Switching in the Schmitt trigger as a result of this increase potential will trigger the crowbar SCR 46 and thereby will short the output terminals 59 and 60 of power supply 56 over leads 43 and 47.

Hysteresis in the Schmitt trigger is not a factor in the accuracy with which the circuits of the present invention protect a load from overvoltage. This is due to the fact that the protective function is only dependent on the initial switching conditions of the trigger and not on the reset conditions since resetting will be carried out automatically as a result of decreasing the power supply output voltage caused by crowbar.

A modified form of the present invention is shown in block diagram form in FIGURE 6 and in full schematic form in FIGURE 7. The components of this form corresponding with the components of the form shown in FIGURES 1 and 2 have been given the same identifying numerals. The major difference between the two forms is the substituting of current limiting resistor 71 and SCR driver 70 for the transistor driver 5 (FIGS. 1 and 2), and the relocation of coupling Zener diode 6. In addition the form shown in FIGURES 6 and 7 includes an overvoltage indicator 72 and a reset switch 73.

As shown in detail in FIGURE 7 the output of the Schmitt trigger at collector 31 is applied through a steering diode 74 and a Zener diode 75 to gate 76 of driver SCR 77. Anode 79 is connected to the plus line through current limiting resistor 80 and the drop across resistor 81 connected in series with cathode 78 is connected across the gate to cathode of crowbar SCR 46 over leads 82 and 83. When the driver SCR 77 is fired by the Schmitt trigger, the drop across resistor 81 fires the crowbar SCR 46. Lamp 84 connected across current limiting resistor 80 will show when the protective circuit has been triggered. In order to reset the driver SCR 77, a momentary opening switch 85 in the power line 52–52' is depressed removing operating voltages and thereby resetting the driver SCR 77.

Still another form of the present invention is shown in detail in the schematic diagram of FIGURE 8 where component circuit parts corresponding with those of the other forms have been given the same designating numbers. In this form a two pole circuit breaker 86 thru 91 and a controlled outlet 92 thru 95 are added. Across the power supply output, the crowbar SCR 46 is effectively in series with the tripping coil 88 in the line 47–47' shunted by a voltage limiting rectifier 96. The circuit breaker contacts 86–87 and 90–91 are in series with transformer 50 and contacts 93–94 of an AC receptacle 92. This receptacle is used for plugging in the power supply being protected so that its power as well as the power to the overvoltage protection circuit is disconnected when crowbar SCR 46 fires. Receptacle 92 may also include a ground terminal 95 to be connected to a ground line 99. When crowbar SCR 46 fires due to a detected overvoltage a voltage equal to the conduction drop of SCR 46 and the forward voltage drop of rectifier 97. The second tripping coil 89 of the circuit breaker is connected in series with primary 97–98 of transformer 50 in order to provide shut-off protection in case of overload trouble in the overvoltage protection device circuitry. This latter protection provides an additional safety feature since the overvoltage protection device could become inoperative and fail to protect the load if an overload condition should develop in its circuitry.

What is claimed is:
1. In an overvoltage protector including in combination;
    a switchable semiconductor crowbar means to be connected across a DC power supply load for crowbarring said power supply;
    a Schmitt trigger circuit;
    driving means for said switchable semiconductor coupled between said Schmitt trigger circuit and said switchable semiconductor for driving said switchable semiconductor into crowbar mode conduction in response to switching of said Schmitt trigger;

voltage divider means and reference voltage means coupled to said Schmitt trigger;

and means for coupling said voltage divider to the load which is connected to said power supply for applying a predetermined portion of the DC voltage across said load to said Schmitt trigger circuit;

whereby load voltage in excess of a predetermined voltage produces crowbarring of the power supply.

2. An overvoltage protector as set forth in claim 1, wherein said voltage divider includes adjustable means for presetting the relationship between overvoltage across the load and said reference voltage whereby the switching point of said Schmitt trigger circuit can be adjustably determined.

3. An overvoltage protector as set forth in claim 1, wherein the power supply to be crowbarred includes a balanced bridge output voltage control circuit and wherein both the load to be protected and said voltage divider means are coupled to said bridge automatic tracking of the crowbarring point of the overvoltage protector.

4. An overvoltage protector as set forth in claim 1, wherein said means for coupling said voltage divider to a load to be protected includes a voltage control bridge circuit with said voltage divider in the voltage control arm of said bridge whereby the overvoltage protection crowbarring point is automatically tracked with the voltage across the load.

5. An overvoltage protector as set forth in claim 1, wherein said means for coupling said voltage divider to the load to be protected adapts said protector to crowbar the load terminals of a power supply remotely coupled to the load to be protected.

6. An overvoltage protector as set forth in claim 1, and including a source of direct current independent of the power supply connected to the load to be protected for energizing said Schmitt trigger.

7. An overvoltage protector as set forth in claim 1, and including means for desensitizing said Schmitt trigger to very short duration pulses of overvoltage.

8. An overvoltage protector as set forth in claim 7, wherein said desensitizing means is a capacitor connected to said Schmitt trigger circuit.

9. An overvoltage protector as set forth in claim 1, wherein said driving means includes a semiconductor amplifier and a Zener diode.

10. An overvoltage protector as set forth in claim 1, wherein said reference voltage means includes a source of regulated voltage and a voltage divider for determining the switching point of said Schmitt trigger.

References Cited

UNITED STATES PATENTS

| | | | |
|---|---|---|---|
| 3,246,206 | 4/1966 | Chowdhuri | 317—33 X |
| 3,253,189 | 5/1966 | Wouk | 317—33 X |
| 3,321,641 | 5/1967 | Howell. | |
| 3,325,718 | 6/1967 | McNulty | 317—33 X |

LEE T. HIX, *Primary Examiner.*

J. D. TRAMMELL, *Assistant Examiner.*

U.S. Cl. X.R.

317—16, 33